United States Patent
Simon

(10) Patent No.: US 7,503,513 B2
(45) Date of Patent: Mar. 17, 2009

(54) METHOD FOR SORTING RECYCLABLE PRODUCTS

(75) Inventor: Jonathan L. Simon, Temple, PA (US)

(73) Assignee: Royal Green, LLC, Temple, PA (US)

( * ) Notice: Subject to any disclaimer, the term of this patent is extended or adjusted under 35 U.S.C. 154(b) by 144 days.

(21) Appl. No.: 11/594,463

(22) Filed: Nov. 8, 2006

(65) Prior Publication Data

US 2008/0105771 A1    May 8, 2008

(51) Int. Cl.
*B02C 23/14* (2006.01)
(52) U.S. Cl. .................. 241/19; 241/24.14; 241/24.18; 241/24.19
(58) Field of Classification Search .............. 241/24.14, 241/24.1, 68, 19, 79.1, 24.18, 24.19; 209/12.1, 209/3, 212, 241
See application file for complete search history.

(56) References Cited

U.S. PATENT DOCUMENTS 5,443,157 A * 8/1995 Baker et al. ................ 209/12.1
5,462,172 A * 10/1995 Kumagai et al. ........... 209/12.1
6,422,493 B1   7/2002 Simon et al.
6,578,783 B2   6/2003 Simon et al.

FOREIGN PATENT DOCUMENTS

JP        2005-288209      * 10/2005

* cited by examiner

*Primary Examiner*—Mark Rosenbaum
(74) *Attorney, Agent, or Firm*—Volpe and Koenig, P.C.

(57) ABSTRACT

A method of producing a fuel substance by separating materials in a recycling operation based on BTU component content is provided. A stream of materials including non-sorted, heterogeneous, recycled materials is shredded. The stream of materials is separated into heavy and light materials with a separator that discharges the light and heavy materials in respective light and heavy material streams. Ferrous and non-ferrous materials are magnetically separated from the heavy material stream. The non-ferrous materials are discharged to a screen for further separation. The light materials are processed through a rotary trommel and a non-ferrous metal separator to separate the light materials into fine, coarse, and non-ferrous metal materials, the coarse materials having a BTU component content of at least four thousand BTU's per ton. Low density materials are separated from the coarse materials with a low density separator, thereby increasing the BTU component content of the coarse materials.

20 Claims, 2 Drawing Sheets

METHOD FOR SORTING RECYCLABLE PRODUCTS

BACKGROUND

The present invention relates to solid waste material sorting and recycling systems. More particularly, the present invention relates to a method of producing a reusable fuel substance as well as other useful substances by separating materials in a salvage operation which receives mixed materials, such as automobiles.

Since millions of automobiles become old or unusable, automobile disposal creates an enormous problem. The scrap metal industry has attempted to alleviate this problem by designing several types of mechanized recycling systems.

At these recycling centers, complete automobile bodies (including the seats and upholstery) as well as other types of metallic (containing various amounts of contamination and non-metallic components) are shredded into smaller pieces. The goal is to separate the metallic from the non-metallic components. While the metallic materials are typically recycled, the non-metallic materials have traditionally been taken to a dump for disposal. This has primarily been due to the industry's inability to find a viable, cost-effective alternative.

In an effort to extend the life of existing landfill facilities and, as space in these facilities becomes more limited, there is renewed interest in exploring new alternatives. This is heightened by the trend in automobile design toward fewer metallic components and an increase in the number of non-metallic components. Therefore, it is necessary to develop systems for sorting and recycling as many reusable automobile components as possible. Specifically, there remains a need for improved methods whereby non-metallic materials are converted into reusable byproducts such as, for example, a fuel substance with a relatively high BTU component content.

SUMMARY

The present invention provides a method of producing a fuel substance by separating materials in a recycling operation based on BTU component content is provided. A stream of materials including non-sorted, heterogeneous, recycled materials is shredded. The stream of materials is separated into heavy and light materials with a separator that discharges the light and heavy materials in respective light and heavy material streams. Ferrous and non-ferrous materials are magnetically separated from the heavy material stream. The non-ferrous materials are discharged to a screen for further separation. The light materials are processed through a rotary trommel and a non-ferrous metal separator to separate the light materials into fine, coarse, and non-ferrous metal materials, the coarse materials having a BTU component. Low density materials are separated from the coarse materials with a low density separator, thereby increasing the BTU component content of the coarse materials

BRIEF DESCRIPTION OF THE DRAWINGS

The foregoing summary, as well as the following detailed description, will be readily understood in conjunction with the appended drawings which illustrate the preferred embodiments of the invention in the drawings.

DETAILED DESCRIPTION OF THE PREFERRED EMBODIMENTS

Figure 1:
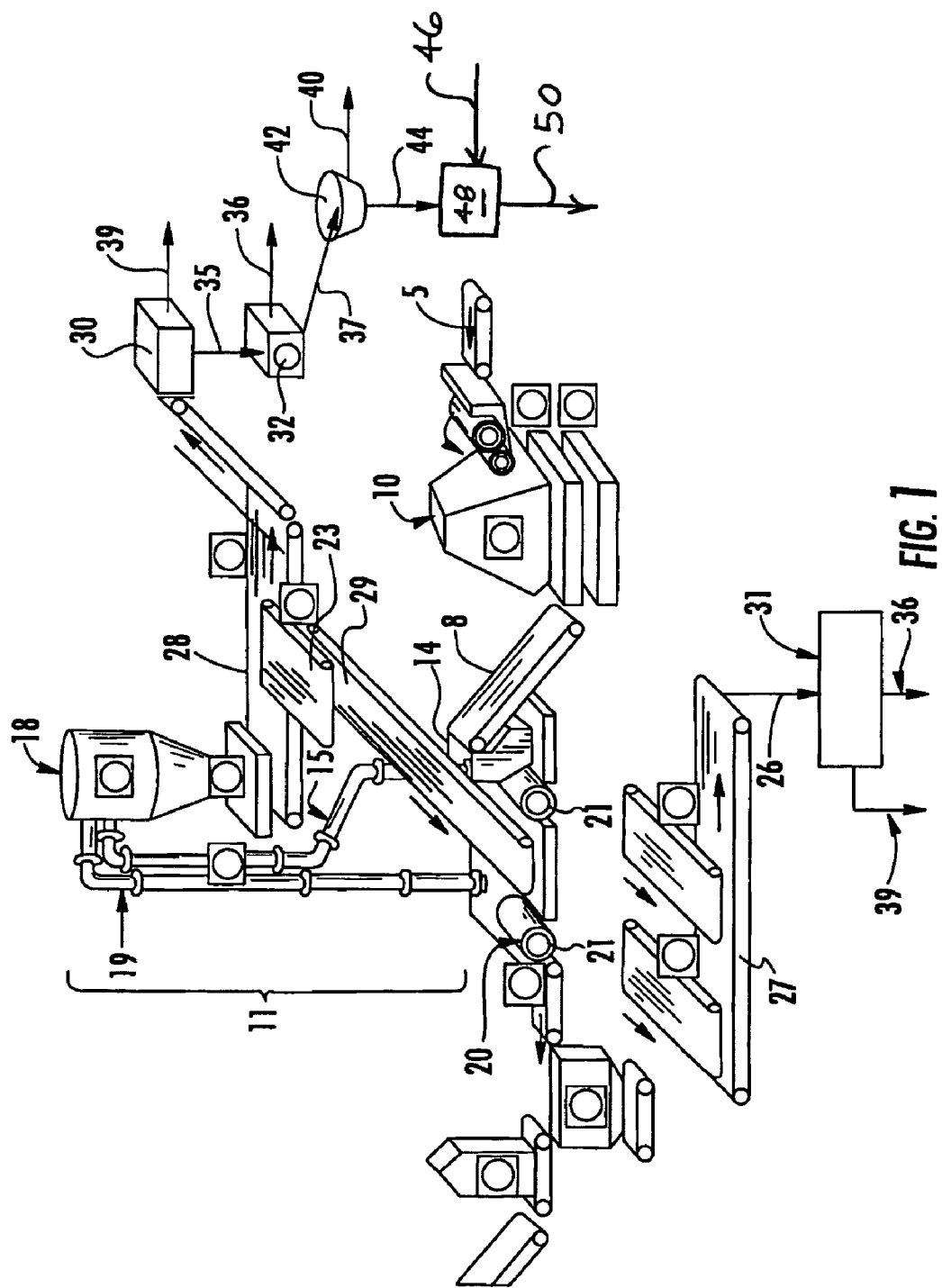
FIG. 1 is a prescriptive view of the separation and recycling system embodying the method of the present invention.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as A, B, or C, means any individual one of A, B, or C, as well as any combination thereof.

The preferred embodiments of the present invention are described below with reference to the drawing figures where like numerals represent like elements throughout.

Figure 2:
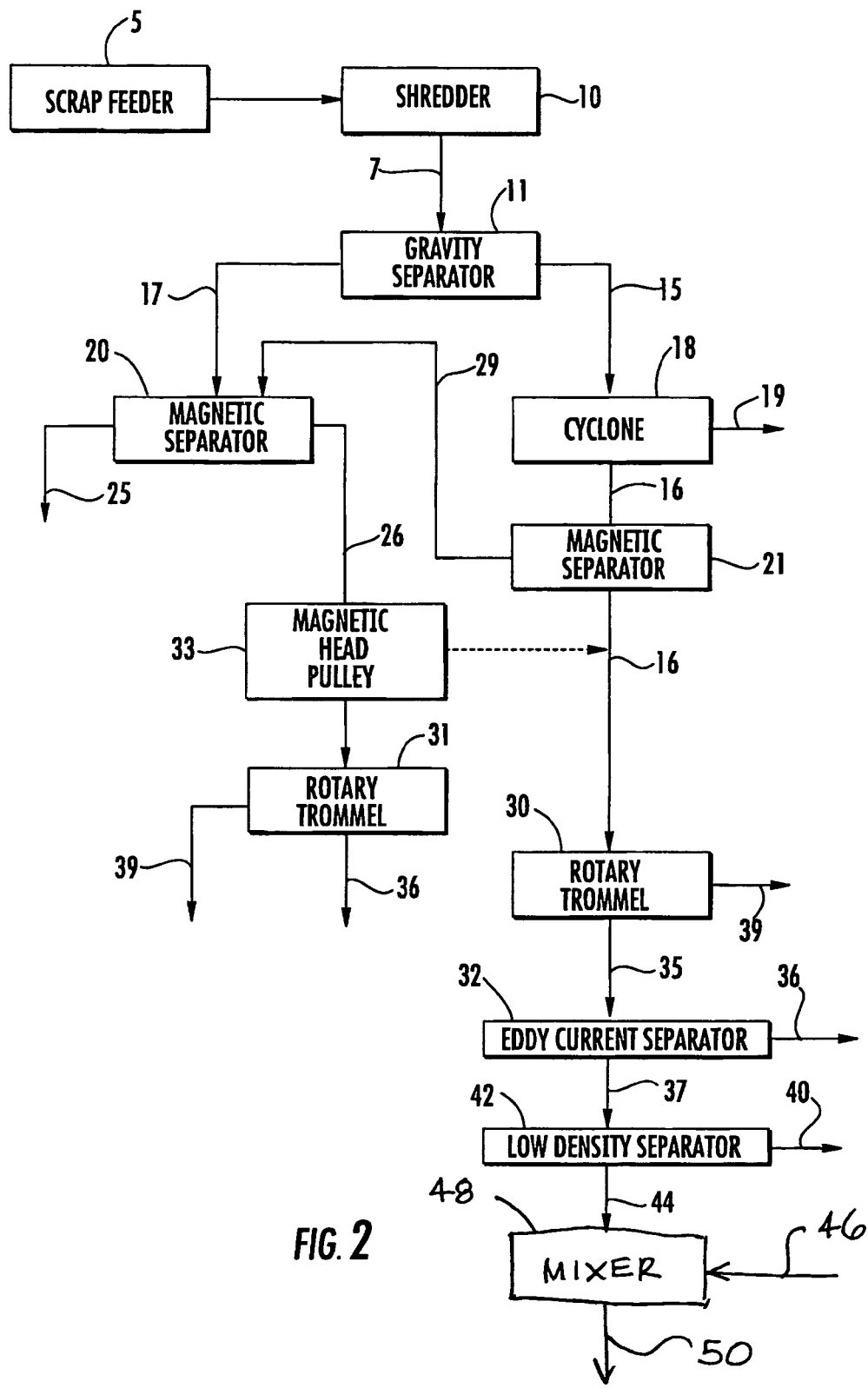
FIG. 2 is a schematic flow diagram of the separation and recycling system embodying the method of the present invention.

Referring to FIGS. 1 and 2, a separation and recycling system used in accordance with the present invention is shown. In the preferred method of the present invention, a scrap feeder 5 delivers a non-sorted (heterogeneous) material stream of recycled material, such as automobiles, office furniture, appliances, industrial equipment, etc. (all of which may contain plastic and/or fabric) to a shredder 10 where they are shredded or fragmented. The shredder 10 is preferably a rotary hammer mill. However, it will be recognized by those skilled in the art that other types or configurations of shredding equipment may be utilized, if desired. Preferably, a surfactant is added to the material stream during shredding.

The shredded materials 7 are then carried by a conveyor 8 to a gravity separator 11. The gravity separator 11 preferably includes an intake tube 15, a cyclone air separator 18 and a clean air exhaust tube 19. The intake tube 15 has a first end that is connected to the intake side of the cyclone air separator 18 and a second end connected to a collection housing 14 where the shredded materials 7 are transported by the conveyor 8. The vacuum air flow generated by the cyclone separator 18 is directed to the shredded material 7 via the intake tube 15. Due to the lower specific gravities of the light materials such as upholstery, plastics, and fabric, they are drawn into the intake tube 15, along with smaller particles of other materials. Heavier materials 17, such as pieces of metal, pass through the gravity separator 11. Return air is fed via the exhaust tube 19 back from the cyclone separator 18 to the housing 10. The intake tube draws approximately 40,000 to 50,000 cubic feet per minute of air to create a vacuum pressure. While the preferred system utilizes gravity separation based on a vacuum force to remove the lighter material portion of the shredded materials 7, other means could be utilized, if desired.

The heavy materials 17, including both ferrous and non-ferrous, are conveyed to a magnetic separator 20 which comprises one or more magnetic rollers 21. As the heavy materials 17 pass through the magnetic separator 20, ferrous metals 25, which are attracted to the magnetic rollers 21, cling to the rollers 21 and are carried through the magnetic separator 20 to a ferrous metal discharge stream 25. While a magnetic drum separator is preferred, those skilled in the art will recognize that other types of magnetic separators can be utilized, if desired. The ferrous metals 25 that are separated are preferably sold for recycling.

The heavy non-magnetic materials 26 fall from the magnetic separator 20 onto one or more conveyors 27 and are carried away for further processing. As shown in FIG. 2, additional ferrous material fines may be removed from the non-magnetic materials 26 via a magnetic head pulley 33 located on the conveyor. These magnetic fines are preferably added to the light material stream 16, as shown. Preferably, these heavy non-magnetic materials 26 are moved to a rotary trommel 31 for further separation by screening. The trommel 31 further separates the non-magnetic materials 26 into a component consisting mainly of non-ferrous metals 36 and a component of fine, non-metallic materials 39. In the preferred embodiment, the trommel 31 has a screen mesh with 3/8-inch openings. Based upon the previous sorting, the fine materials 39 which pass through the screen of the trommel 31 are rendered generally inert due to the surfactant added during shredding, and can be used as an alternate daily or periodic cover for landfills. The remaining component, consisting of mainly non-ferrous metals 36, is preferably sold for reuse.

The light materials drawn into the vacuum air stream of the intake tube 15 are drawn into the cyclone air separator 18. The cyclone air separator 18 separates the light materials from the air and delivers the air back to the collection housing 14 through the clean air exhaust tube 19. The light material stream 16, which can include glass, cloth, rubber, foam rubber, dirt, tar, and plastics, as well as some ferrous and non-ferrous metals, is carried via a conveyor 28 past a cross belt magnetic separator 23 which separates the magnetic materials in the light material stream 16. The magnetic materials in the light material stream 16 are returned to the magnetic separator 20 via a return conveyor 29. Alternatively, the magnetic materials could be conveyed directly to the ferrous metal stream 25 that exits the magnetic separator 20.

The remaining light material stream is then conveyed to a rotary trommel 30 for further separation. The rotary trommel 30 preferably includes a 3/8-inch screen and separates the remaining light material stream into a fine material 39, which includes non-ferrous as well as some ferrous fines, and the coarse material. These fines 39 tend to agglomerate due to the surfactant added during shredding and become generally inert. The fine material 39 from the trommel 30 can also be used as an alternate daily or periodic cover for landfills. The fine material 39 may be further mixed with materials such as construction and demolition debris that have been ground, or any other material such as gravel that has been similarly ground, to provide a material with an overall reduced waste per unit volume of material.

The remaining coarse material 35 is further separated utilizing an eddy current separator 32 of the type well known in the art, such as an ERIEZ eddy current separator, to remove non-ferrous metal material 36. However, those skilled in the art will recognize from the present disclosure that eddy current separators from other manufacturers may be utilized. The non-ferrous metal materials 36 are preferably sold for recycling.

The remaining coarse material 37 has been found to have a BTU content which is high enough to be used as a fuel or fuel additive. Testing has shown that this remaining coarse material 37 from the shredded stream of material 7 has a BTU content of 4000 BTU/ton or more, depending on the input stream. In two separate tests, the coarse fuel material had a BTU content of over 6000 BTU/ton, and is preferably in the range of 5000-7000 BTU/ton. This coarse fuel material 37 can be further crushed, ground, or shredded, and additional fines removed, if desired. This allows the now reduced fuel material 37 to be used as a blown-in fuel component. The coarse fuel material 37 may also be utilized as an additive for bituminous coal fired ovens in order to increase the BTU content for certain applications, or may be used directly as a fuel. The fuel material 37 may also be pelletized, if desired.

A further step in the process includes separating low density material 40 from the coarse materials 37 with a low density separator 42, thereby increasing the BTU component content per unit of the coarse materials 37. More specifically, approximately 35-40% of the volume of the coarse materials 37 comprises low density material 40 such as, for example, foam. The foam 40 within the coarse materials 37 contains, among other things, a substantial amount of air. Removal of the foam 40 from the coarse materials 37 utilizing a low density separator 42 creates denser coarse materials 44. The increased density of the coarse materials 44 results in a fuel material 44 that has a greater BTU content per unit volume than that of the coarse materials 37 described above. The coarse materials 44 may optionally be blended with combustible materials 46, e.g., wood chips, in a mixer 48 to achieve a material 50 with either greater BTU content per unit volume or improved chemical properties.

The low density separator 42 may remove the foam 40 from the coarse materials 44 in a variety of manners. For example, the low density material 40 and coarse materials 44 may be separated by specific gravity, by cyclone air separation, or by crushing and screening the coarse material 44 to remove the low density material 40.

The foam 40 that is removed may generally range from 1½ inches to 2½ inches in size, or may be smaller or larger than this range. Such foam 40 is a reusable byproduct suitable for a variety of applications. For example, the recovered foam 40 may be used as part of a mixture for use as underlay or covering for flooring material. The recovered foam 40 may also be used as a component of high- or low-density concrete. Furthermore, un-shredded foam (i.e., foam recovered from the stream of recycled material prior to entering the shredder 10) may be utilized as a reusable byproduct as described above.

The present invention allows the entire stream of shredded material from the recycler to be recycled either for re-use in the case of the ferrous and non-ferrous metals, for use as landfill cover material, or for use as a fuel or fuel additive. This generates additional revenue for the salvage operator, and eliminates the costs previously associated with having to landfill a portion of the shredded waste stream 7.

While the preferred embodiment is used in connection with auto salvage as well as mixed material waste streams which include a mix of metals and plastics, such as metal and plastic furniture, appliances, and/or office equipment, it can be used in conjunction with various other types of manufacturing waste streams which include a mix of metal and plastic materials.

While the preferred embodiment of the invention has been described in detail, the invention is not limited to the specific embodiment described above, which should be considered as merely exemplary. Further modifications and extensions of the present invention may be developed, and all such modifications are deemed to be within the scope of the present invention as defined by the appended claims.

What is claimed is:

1. A method of separating and reusing or recycling materials in a recycling operation based on BTU component content comprising the steps of:
   shredding a stream of materials comprising non-sorted, heterogeneous, recycled materials;
   separating the stream of materials into heavy materials and light materials with a separator, the separator discharging the light materials in a light material stream and the heavy materials in a heavy material stream;
   magnetically separating ferrous and non-ferrous materials from the heavy material stream;
   discharging the non-ferrous materials to a screen for further separation;

processing the light materials through a rotary trommel and a non-ferrous metal separator to separate the light materials into fine materials, coarse materials, and non-ferrous metal materials, the coarse materials having a BTU component;

separating low density material from the coarse materials with a low density separator, thereby increasing the BTU component content per unit of volume of the coarse materials; and producing a fuel substance using the coarse materials with the low density material removed.

2. The method of claim 1, wherein the stream of materials comprises non-sorted recycled materials including a mixture of metal, plastic, and fiber.

3. The method of claim 1, further comprising the step of separating the light materials from the heavier materials utilizing a vacuum to draw light materials from the stream of materials.

4. The method of claim 3, wherein the light and heavy materials are separated by specific gravity.

5. The method of claim 3, further comprising the step of separating the light materials from a return air stream by cyclone air separation.

6. The method of claim 1, further comprising the step of separating the non-ferrous materials derived from the heavy material stream into non-ferrous metallic and non-metallic materials.

7. The method of claim 1, wherein the low density material and coarse materials are separated by specific gravity.

8. The method of claim 1, wherein the low density material and coarse materials are separated by cyclone air separation.

9. The method of claim 1, wherein the low density material and coarse materials are separated by crushing and screening the coarse materials to remove the low density material.

10. The method of claim 1, wherein a unit of the coarse materials is greater than three eighths of an inch in size.

11. The method of claim 1, further comprising the step of using the fine materials as an alternative daily cover for landfills.

12. The method of claim 1, further comprising the step of using the low density material as part of a mixture for use as underlay or covering for flooring material.

13. The method of claim 1, further comprising the step of using the low density material as a component of concrete.

14. The method of claim 1, wherein the low density material is foam.

15. The method of claim 1, wherein the non-ferrous metals are recycled.

16. The method of claim 1, where the non-sorted, heterogeneous, recycled materials include at least one of automobiles, appliances, office furniture, and industrial equipment.

17. The method of claim 1, further comprising the step of blending the separated coarse materials with a combustible material.

18. The method of claim 1, further comprising the step of blending the separated coarse materials with a combustible material in a mixer.

19. The method of claim 18, wherein the combustible material. comprises wood chips.

20. The method of claim 1, further comprising the step of blending the separated coarse materials with a combustible material in a mixer, resulting in separated coarse materials with either greater BTU content per unit volume or improved chemical properties.

* * * * *